United States Patent [19]

Kirsch

[11] Patent Number: 4,549,973
[45] Date of Patent: * Oct. 29, 1985

[54] DECOLORIZATION OF CALCIUM BROMIDE BRINES

[75] Inventor: Warren B. Kirsch, Baton Rouge, La.

[73] Assignee: Ethyl Corporation, Richmond, Va.

[ * ] Notice: The portion of the term of this patent subsequent to Sep. 18, 2001 has been disclaimed.

[21] Appl. No.: 488,159

[22] Filed: Apr. 25, 1983

[51] Int. Cl.$^4$ .................................................. C09K 7/00
[52] U.S. Cl. ............................ 252/8.55 R; 252/8.5 B; 210/719; 210/757; 210/917; 75/109; 423/143
[58] Field of Search ............ 252/8.55 R, 8.5 A, 8.5 B; 210/719, 720, 721, 722, 757, 758, 917, 702; 585/860; 423/143, 491, 497, 499; 75/108, 109

[56] References Cited

U.S. PATENT DOCUMENTS

| | | | |
|---|---|---|---|
| 3,431,068 | 3/1969 | Burk | 23/89 |
| 3,541,173 | 11/1970 | Solomon | 585/860 |
| 3,791,866 | 2/1974 | Kunin | 127/46.2 |
| 3,847,598 | 11/1974 | Coulter | 210/719 |
| 3,857,704 | 12/1974 | Coulter | 210/719 |
| 4,083,942 | 4/1978 | Sanders | 423/497 |
| 4,087,359 | 5/1978 | Patron | 210/719 |
| 4,248,850 | 2/1981 | Keblys | 423/491 |
| 4,287,072 | 9/1981 | Beecher | 210/757 |
| 4,397,720 | 8/1983 | Moore | 210/757 |

FOREIGN PATENT DOCUMENTS

| | | | |
|---|---|---|---|
| 2057358 | 5/1972 | Fed. Rep. of Germany | 210/719 |
| 53-39272 | 4/1978 | Japan | 210/917 |

OTHER PUBLICATIONS

Hawley, The Condensed Chemical Dictionary, Van Nostrand, N.Y., 1971, pp. 459–460.

*Primary Examiner*—Ernest G. Therkorn
*Attorney, Agent, or Firm*—Donald L. Johnson; John F. Sieberth; Paul H. Leonard

[57] ABSTRACT

A process for removing or decreasing the amount of color in a solution such as an oil well brine by adding hydroxylamine or hydrazine. The hydroxylamine or hydrazine may be added in any form such as the pure compound, a salt, the hydrate or the like.

7 Claims, No Drawings

DECOLORIZATION OF CALCIUM BROMIDE BRINES

BACKGROUND OF THE INVENTION

1. Field of the Invention

The present invention is directed to a method for removing or decreasing color from a solution. More particularly, this invention is a process for removing or decreasing the amount of color in a clear, high density brine used in oil or gas wells by adding hydroxylamine or hydrazine.

2. Description of the Prior Art

Clear, high density brines are used in oil well completions and workovers. They are also used as oil well packer fluids. Packer fluids are the fluids which are left in the annular space between the tubing and casing of oil wells. The primary purpose of thee fluids is to balance the pressure in the well so as to prevent a well "blow out" without losing the fluid to the formation, and without damaging the formation as is done when solids-laden fluids are used. The densities required by these brines are determined by the well pressures and depths.

Oil well brines are usually prepared by blending different amounts and types of salt solutions to get the required density and clarity at the lowest cost. Such brines must be clear, that is, free of solids or solids forming materials. Sometimes these brines have color immediately after preparation and the amount of color may increase with time. Alternatively, color can be acquired upon aging or upon blending various brines. Brines are oftentimes blended to obtain a desired density. The cause of the color is not always apparent. Color related problems may have originated in the brine manufacturing process or impurities of some type may be "picked-up" during shipping, storing, handling or during the use of the brine "downhole" in a hot oil well.

The problem of color removal in calcium bromide brines is of particular interest. Calcium bromide brines can be prepared in a number of ways yet, generally, some degree of color is imparted to the brine irrespective of the exact method of preparation. Metal bromides such as calcium bromide can be prepared by contacting a basic alkaline earth metal compound in an aqueous medium with bromine in the presence of a lower alkanol as a reducing agent. Calcium bromide brines can also be prepared using hydrogen bromide and lime.

U.S. Pat. No. 4,083,942 discloses the preparation of alkali and alkaline earth metal bromides by reacting a basic compound of an alkali or alkaline earth metal with a reducing agent in the presence of water followed by the addition of alternate portions of bromine and a basic compound while maintaining the pH at less than 7.0.

More recently, it was disclosed in U.S. Pat. No. 4,248,850 that alkali and alkaline earth metal bromides could be prepared by contacting in an aqueous medium a basic metal compound and bromine in the presence of added formaldehyde as a reducing agent.

In U.S. Pat. No. 3,431,068, there is disclosed a method of preparing alkali metal halides but not alkaline earth metal halides by reacting an alkali metal hydroxide with an elemental halogen in a liquid, saturated aliphatic or alicyclic alcohol or ketone, or a saturated aliphatic aldehyde. According to this process, the formation of unwanted halate salt by-products associated with alkali metal halide production is dimished or eliminated.

It is economically advantageous to treat new or used metal bromide solutions in a manner which eliminates color U.S. Ser. No. 408,035 filed Aug. 13, 1982 now U.S. Pat. No. 4,472,285, claims the use of zinc to remove color causing iron impurities from a brine. However, the source of the color may not be detectable and alternative techniques for color removal in brines are necessary. It is desirable to keep these fluids clear and colorless with minimal cost.

SUMMARY OF THE INVENTION

Accordingly, an object of the present invention is to remove or decrease color from solution such as a brine using hydroxylamine or hydrazine as either the pure compound, a salt, the hydrate or the like.

DESCRIPTION OF THE PREFERRED EMBODIMENTS

This invention is directed to a process for removing or decreasing the color of a solution comprising adding to said solution a decoloring agent selected from the group consisting of hydroxylamine and hydrazine, as either the pure compound, a salt, the hydrate or the like, in a sufficient amount to remove or decrease the amount of color present in said solution.

Any solution containing color may be treated in the manner taught by the present invention. The degree of color removal will depend on the type of solution to be treated and the amount of hydroxylamine or hydrazine used. Color is frequently a problem for brines used in oil wells. Typical salts found in brines include calcium chloride, calcium bromide, zinc chloride, zinc bromide, sodium chloride, sodium bromide, potassium chloride, potassium bromide, and the like, including mixtures thereof. Impurities may arise in the preparation of a brine. Oftentimes, the impurities do not cause a noticeable color change until the brine is blended with another salt solution. The purpose of the blending procedure is to obtain a solution having a specific density. The density is determined by the amount of each salt present. Due to the relatively high cost of high density brine, there is a strong motivation to reuse the solution. However, recovered brine, having been downhole in an oil well, frequently acquires color rendering it generally unsuitable for reuse.

Brine, especially those containing calcium bromide, oftentimes acquire a yellow appearance after standing. This phenomena may occur with fresh solutions. On occasion, brown solids come out of the solution. It has been discovered that addition of a decolorizing agent such as hydroxylamine or hydrazine to these discolored brines removes or decreases the undesirable color.

The decolorizing agent used in the practice of the present invention is selected from the group consisting of hydroxylamine and hydrazine as either the pure compound, a salt, the hydrate or the like. Hydroxylamine may be in the form of the pure compound, a solution of hydroxylamine such as 10% in water, hydroxylamine hydrate, hydroxylamine hydrochloride, hydroxylamine hydrobromide, hydroxylamine sulfate, substituted hydroxylamine and its salts, and the like. The preferred form of hydroxylamine is hydroxylamine hydrochloride.

Hydrazine may also be in the form of the pure compound, as a solution, as a hydrazine hydrate, hydrazine hydrochloride, hydrazine dihydrochloride, hydrazine hydrobromide, hydrazine dihydrobromide, hydrazine sulfate, hydrazine disulfate, substituted hydrazine and its salts, and the like.

Hydroxylamine hydrochloride is preferred over hydrazine. After dissolving crystalline hydroxylamine hydrochloride in a solvent, it is a liquid which can be added directly to the finished product. No heat or filtration is required and only mild agitation is necessary. Hydroxylamine hydrochloride is therefore easier to handle and more economical.

The amount of hydroxylamine or hydrazine used in the practice of the present invention is sufficient to eliminate or decrease the amount of color present in the solution. The preferred amount of hydroxylamine or hydrazine is dictated by the type of solution selected, the amount and type of color-causing impurities present and the degree of color decrease desired. Generally, the amount of hydroxylamine or hydrazine ranges from about 25 to 5000 parts per million (ppm), preferably 50 to 1000 ppm and more preferably 75 to 100 ppm.

The addition of the hydroxylamine or hydrazine to the solution is conducted at a temperature high enough to cause the reaction to proceed, yet not so high as to adversely affect the course of the reaction. The addition is most conveneintly carried out at room temperature. The addition is generally conducted under ambient pressures since these are most economical. However, reaction pressure is not critical.

The mechanism of color removal by hydroxylamine and hydrazine is not understood. But in addition to a decrease in color, suspended solids present in the solution may be dissolved.

The following examples illustrate the process of adding hydroxylamine or hydrazine to a brine to decrease color. This example is in no manner intended to limit the invention described.

EXAMPLE 1

Preparation of $CaBr_2$ Fluid

Water (22.63 g; 1.26 moles), methanol (2.01 g; 0.063 mole), and lime (7.85 g; 0.106 mole) were added to a 100 mL, three-neck round bottom flask equipped with an overhead mechanical stirrer and an addition funnel. Bromine was added dropwise with stirring to the flask from the addition funnel. The reaction mixture became hot and required external cooling to prevent refluxing. After 4.5 mL bromine had been added, an additional quantity of lime (7.84 g; 0.106 mole) was added to the flask and bromine addition was continued. After the addition of 9 mL of bromine, some carbon dioxide began to evolve. Total bromine addition was 9.5 mL (28.8 g; 0.18 mole). The reaction mixture was then heated to 50°–60° C. and held at that temperature for one hour and then to 70° for 0.5 hour. The solution was cooled and filtered to give a calcium bromide solution having a density of 14 lbs/gal. Analysis by NMR showed only 0.03 weight percent of unreacted methanol remaining. The presence of formaldehyde and formic acid could not be detected.

EXAMPLE 2

Color Reduction using Hydroxylamine Hydrochloride

A $CaBr_2$ fluid made following Example 1 had acquired a yellow appearance after standing in a container. The $CaBr_2$ fluid was decanted, leaving settled solids in the container. The supernatant was dark but clear and had an APHA number greater than 100.

Hydroxylamine hydrochloride (0.100 g, 1000 ppm) was added to 100 g of the $CaBr_2$ fluid. The mixture was stirred for about three minutes and appeared close to white in color. Measured APHA color was approximately 5 to 10.

EXAMPLE 3

Color Reduction with Hydroxylamine Hydrochloride

This example was conducted similar to Example 2 except 0.0100 g (100 ppm) of hydroxylamine hydrochloride was added to the $CaBr_2$ solution. Once again the solution appeared close to white in color and the measured APHA color was approximately 5 to 10.

EXAMPLE 4

Color Reduction with Hydroxylamine Hydrochloride

Another sample of $CaBr_2$ fluid that had been stored in a storage tank and contained dark settled solids was selected for treatment. The measured APHA color was greater than 100. The sample of $CaBr_2$ fluid containing solids was shaken and 100 g was removed. Approximately 0.0118 g (118 ppm) of hydroxylamine hydrochloride was added to the $CaBr_2$ solution in an open beaker at room temperature and the solution was stirred. Within two minutes the solution was very light yellow and clear. Measured APHA color was approximately 30 to 35.

EXAMPLE 5

Color Reduction with Hydrochloride Hydroxylamine 232 g of Dow Well Packing Fluid which is a calcium bromide solution from Dow Chemical had a measured APHA color of approximately 40 to 50. The sample contained solids and was hazy in appearance. This sample was treated with 0.0251 g (108 ppm) hydroxylamine hydrochloride with stirring. Within five minutes the sample was white and clear in appearance and had a measured APHA of approximately 15.

I claim:

1. A process for removing or decreasing the amount of color in a brine containing at least one salt selected from the group consisting of calcium chloride, calcium bromide, zinc chloride, zinc bromide, sodium chloride, sodium bromide, potassium chloride, potassium bromide and mixtures thereof comprising adding to said brine hydroxylamine, as either the pure compound, a salt, or the hydrate, in a sufficient amount to remove or decrease the amount of color present in said brine.

2. A process, as recited in claim 1, wherein said brine contains calcium bromide.

3. A process, as recited in claim 1, wherein said hydroxylamine is hydroxylamine hydrochloride.

4. A process, as recited in claim 3, wherein the amount of hydroxylamine hydrochloride is about 25 to 5000 parts per million.

5. A process for removing or decreasing color from a high density brine used in oil wells, said brine containing at least one salt selected from the group consisting of calcium chloride, calcium bromide, zinc chloride, zinc bromide, sodium chloride, sodium bromide, potassium chloride, potassium bromide and mixtures thereof, said process comprising: adding to said brine a decolorizing agent selected from the group consisting of hydroxylamine as either the pure compound, a salt, or the hydrate, in a sufficient amount to remove or decrease the amount of color present in said brine.

6. A process, as recited in claim 5, wherein said brine contains calcium bromide.

7. A process, as recited in claim 5, wherein said decolorizing agent is hydroxylamine hydrochloride.

* * * * *